(12) United States Patent
Chen et al.

(10) Patent No.: US 8,432,708 B2
(45) Date of Patent: Apr. 30, 2013

(54) MOTHERBOARD ASSEMBLY HAVING SERIAL ADVANCED TECHNOLOGY ATTACHMENT DUAL IN-LINE MEMORY MODULE

(75) Inventors: Guo-Yi Chen, Shenzhen (CN); Wei-Dong Cong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 93 days.

(21) Appl. No.: 13/228,459

(22) Filed: Sep. 9, 2011

(65) Prior Publication Data

US 2013/0050970 A1    Feb. 28, 2013

(30) Foreign Application Priority Data

Aug. 31, 2011    (CN) .......................... 2011 1 0254842

(51) Int. Cl.
*H05K 1/11*    (2006.01)

(52) U.S. Cl.
USPC ...... 361/803; 361/679.31; 361/785; 361/790; 710/58; 710/313; 710/316; 711/105

(58) Field of Classification Search .................. 361/803, 361/679.31, 785, 790; 710/58, 313, 316; 711/105
See application file for complete search history.

(56) References Cited

U.S. PATENT DOCUMENTS

| | | | |
|---|---|---|---|
| 2011/0153903 A1* | 6/2011 | Hinkle et al. | 710/313 |
| 2012/0059967 A1* | 3/2012 | Hinkle et al. | 710/313 |
| 2012/0059970 A1* | 3/2012 | Hinkle et al. | 710/316 |
| 2013/0003285 A1* | 1/2013 | Liang et al. | 361/679.31 |
| 2013/0016471 A1* | 1/2013 | Chen | 361/679.31 |

* cited by examiner

*Primary Examiner* — Xiaoliang Chen
(74) *Attorney, Agent, or Firm* — Altis Law Group, Inc.

(57) ABSTRACT

A motherboard assembly includes a motherboard having an expansion slot and a storage device interface, and a serial advanced technology attachment dual in-line memory module (SATA DIMM) with a circuit board. A control chip and a storage chip are arranged on the circuit board. Two voids are defined in a top side of the circuit board. A first extending board is formed on the top side of the circuit board between the voids. An edge connector is arranged on the first extending board and connected to a power supply. The edge connector includes power pins connected to the control chip and the storage chip. A second extending board is extended from an end edge of the circuit board and includes a connector connected to the storage device interface of the motherboard. A bottom side of the second extending board is in alignment with a bottom side of the circuit board.

7 Claims, 2 Drawing Sheets

MOTHERBOARD ASSEMBLY HAVING SERIAL ADVANCED TECHNOLOGY ATTACHMENT DUAL IN-LINE MEMORY MODULE

BACKGROUND

1. Technical Field

The present disclosure relates to a motherboard assembly having a serial advanced technology attachment dual in-line memory module (SATA DIMM).

2. Description of Related Art

Solid state drives (SSD) store data on chips instead of on magnetic or optical discs. One type of SSD is a SATA DIMM. In use the SATA DIMM is inserted into a memory slot of a motherboard. However, if the SATA DIMM module is plugged in or unplugged from the memory slot while the motherboard is powered up, the memory slot or the motherboard may be damaged. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
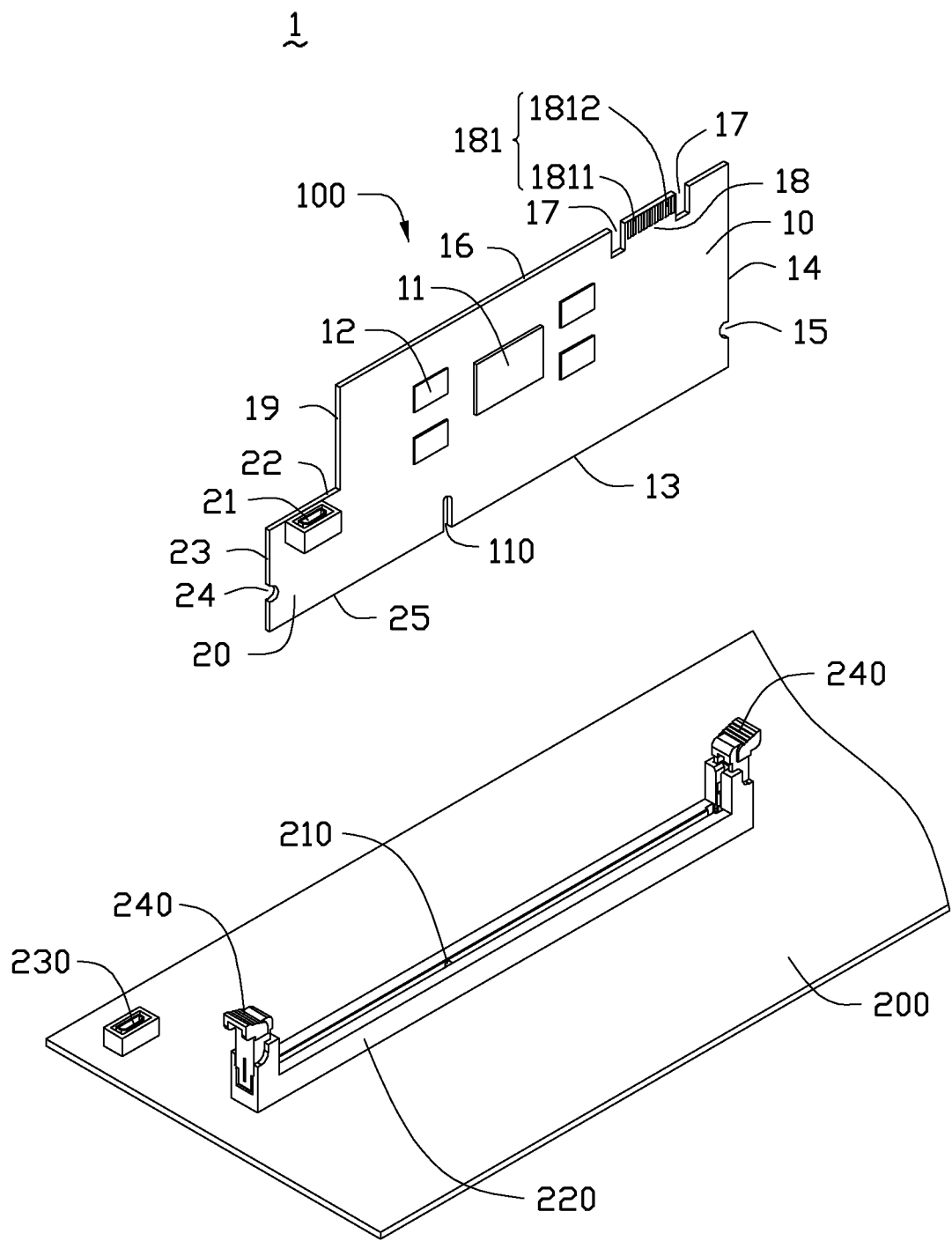
FIG. 1 is an exploded, isometric view of a motherboard assembly in accordance with an exemplary embodiment of the present disclosure.
Figure 2:
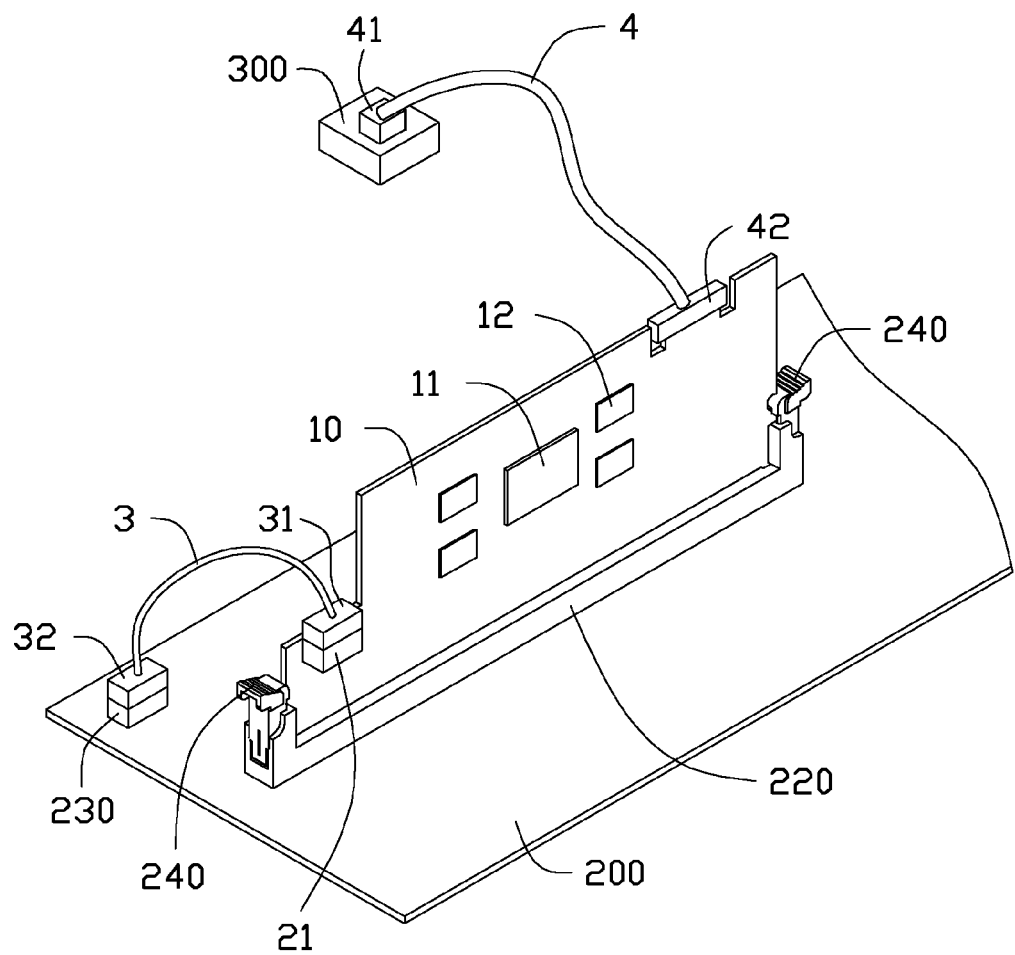
FIG. 2 is an assembled, isometric view of the motherboard assembly of FIG. 1.

Referring to FIGS. 1 and 2, a motherboard assembly 1 in accordance with an exemplary embodiment includes a serial advanced technology attachment dual in-line memory module (SATA DIMM) 100, and a motherboard 200. An expansion slot 220 and a storage device interface 230 are arranged on the motherboard 200. The expansion slot 220 includes a protrusion 210 arranged in the expansion slot 220, and two fixing elements 240 set on two ends of the expansion slot 220 respectively. In one embodiment, the expansion slot 220 is a double data rate type three (DDR3) memory slot. The storage device interface 230 is a SATA connector.

The SATA DIMM 100 includes a substantially rectangular circuit board 10. A control chip 11 and a plurality of storage chips 12 are arranged on the circuit board 10. A notch 110 is defined in a bottom side 13 of the circuit board 10. A groove 15 is defined in an end edge 14 of the circuit board 10. Two voids 17 are defined in a top side 16 of the circuit board 10. A first extending board 18 is formed on the top side 16, coplanar with the circuit board 10 and located between the voids 17. An edge connector 181 is arranged on the first extending board 18, and includes a plurality of power pins 1811 and a plurality of ground pins 1812. The power pins 1811 are connected to the control chip 11 and the storage chips 12. The ground pins 1812 are connected to a ground layer (not shown) of the circuit board 10. The edge connector 181 is connected to a power supply 300 by a cable 4 with two power interfaces 41 and 42.

A second extending board 20 is extended from an end edge 19 of the circuit board 10 opposite to the groove 15, and is coplanar with the circuit board 10. A connector 21, such as a SATA connector, is arranged on the second extending board 20 and located adjacent to a top side 22 of the second extending board 20, and connected to the storage device interface 230 of the motherboard 200 through a cable 3 with two storage device interfaces 31 and 32. A bottom side 25 of the second extending board 20 is in alignment with the bottom side 13 of the circuit board 10. A groove 24 is defined in an end edge 23 of the second extending board 20 opposite to the circuit board 10. The top side 22 of the second extending board 20 is lower than the top side 16 of the circuit board 10. When the connector 21 is connected to a storage device interface, a top surface of the storage device interface is lower than or coplanar with the top side 16 of the circuit board 10. Thus, reducing interference between the SATA DIMM 100 and a chassis (not shown) when the SATA DIMM 100 is mounted on the motherboard 200 accommodated in the chassis. In other embodiments, the first extending board 18 may be formed on the end edge 14 or 19 of the circuit board 10, or formed on the end edge 23 of the second extending board 20.

In assembly, the SATA DIMM 100 is inserted into the expansion slot 220 through the bottom side 13, and the protrusion 210 of the slot 220 engages in the notch 110 of the circuit board 10. The fixing elements 240 engage with the grooves 15 and 24, to fix the SATA DIMM 100 to the expansion slot 220. The connector 21 is connected to the storage device interface 230 by the cable 3. The edge connector 181 is connected to the power supply 300 by the cable 4.

In use, when the motherboard 200 and the power supply 300 receive power, the power supply 300 provides a voltage to the SATA DIMM module 100 through the cable 4 and the edge connector 181. The motherboard 200 outputs a control signal, such as a hard disk drive (HDD) signal, to the control chip 12 through the storage device interface 230, the cable 3, and the connector 21, to enable communication between the SATA DIMM 100 and the motherboard 200.

The SATA DIMM 100 can be inserted into the expansion slot 220 through the bottom side 13 and the bottom side 25, to fix the SATA DIMM 100 on the motherboard 200. The SATA DIMM 100 receives a voltage from the power supply 300 through the edge connector 181, and receives a control signal from the motherboard 200 through the connector 21, to enable communication between the SATA DIMM 100 and the motherboard 200. Thus, damage to the expansion slot 220 or the motherboard 200 can be avoided during installation or removal of the SATA DIMM 100.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A motherboard assembly comprising:
a motherboard comprising:
an expansion slot arranged on the motherboard; and
a first storage device interface arranged on the motherboard; and a serial advanced technology attachment dual in-line memory module (SATADIMM) comprising:

a circuit board;

a control chip arranged on the circuit board;

a plurality of storage chips arranged on the circuit board and connected to the control chip;

two voids defined in a top side of the circuit board;

a first extending board formed on the top side of the circuit board between the voids, wherein an edge connector is arranged on the first extending board, and comprises a plurality of power pins connected to the control chip and the plurality of storage chips, and a plurality of ground pins, the edge connector is connected to a power supply; and a second extending board extended from an end edge of the circuit board and coplanar with the circuit board, wherein a connector is arranged on the second extending board, a bottom of the second extending board is in alignment with a bottom side of the circuit board, to be inserted into the expansion slot of the motherboard together with the bottom side of the circuit board, the connector of the second extending board is connected to the first storage device interface of the motherboard.

2. The motherboard assembly of claim 1, wherein the expansion slot comprises a protrusion, a notch is defined in the bottom side of the circuit board, to engage with the protrusion of the expansion slot when the SATA DIMM is inserted into the expansion slot.

3. The motherboard assembly of claim 1, wherein the connector of the second extending board is connected to a second storage device interface at a first end of a cable, a third storage device interface at a second end of the cable is connected to the first storage device interface of the motherboard.

4. The motherboard assembly of claim 1, wherein the connector of the second extending board is a SATA connector, the first storage device interface of the motherboard is a SATA connector.

5. The motherboard assembly of claim 1, wherein the first extending board is connected to a first power interface at a first end of a cable, a second power interface at a second end of the cable is connected to the power supply.

6. The motherboard assembly of claim 1, wherein the circuit board is rectangular, two grooves are respectively defined in an end edge of the circuit board opposite to the second extending board and an end edge of the second extending board opposite to the circuit board, the expansion slot further comprises two fixing elements formed at two ends of the expansion slot, to engage with the grooves.

7. The motherboard assembly of claim 6, wherein the expansion slot is a double data rate type three memory slot.

* * * * *